Oct. 21, 1924.   
M. C. ANDERSON  
1,512,399  
RAIL CONSTRUCTION FOR REAR DUMP VEHICLES  
Original Filed Feb. 16, 1922   3 Sheets-Sheet 1

Witnesses:  
W. F. Kilroy  
Harry R. L. White

Inventor:  
Magnus C. Anderson  
By Gabel & Mueller  
Attys.

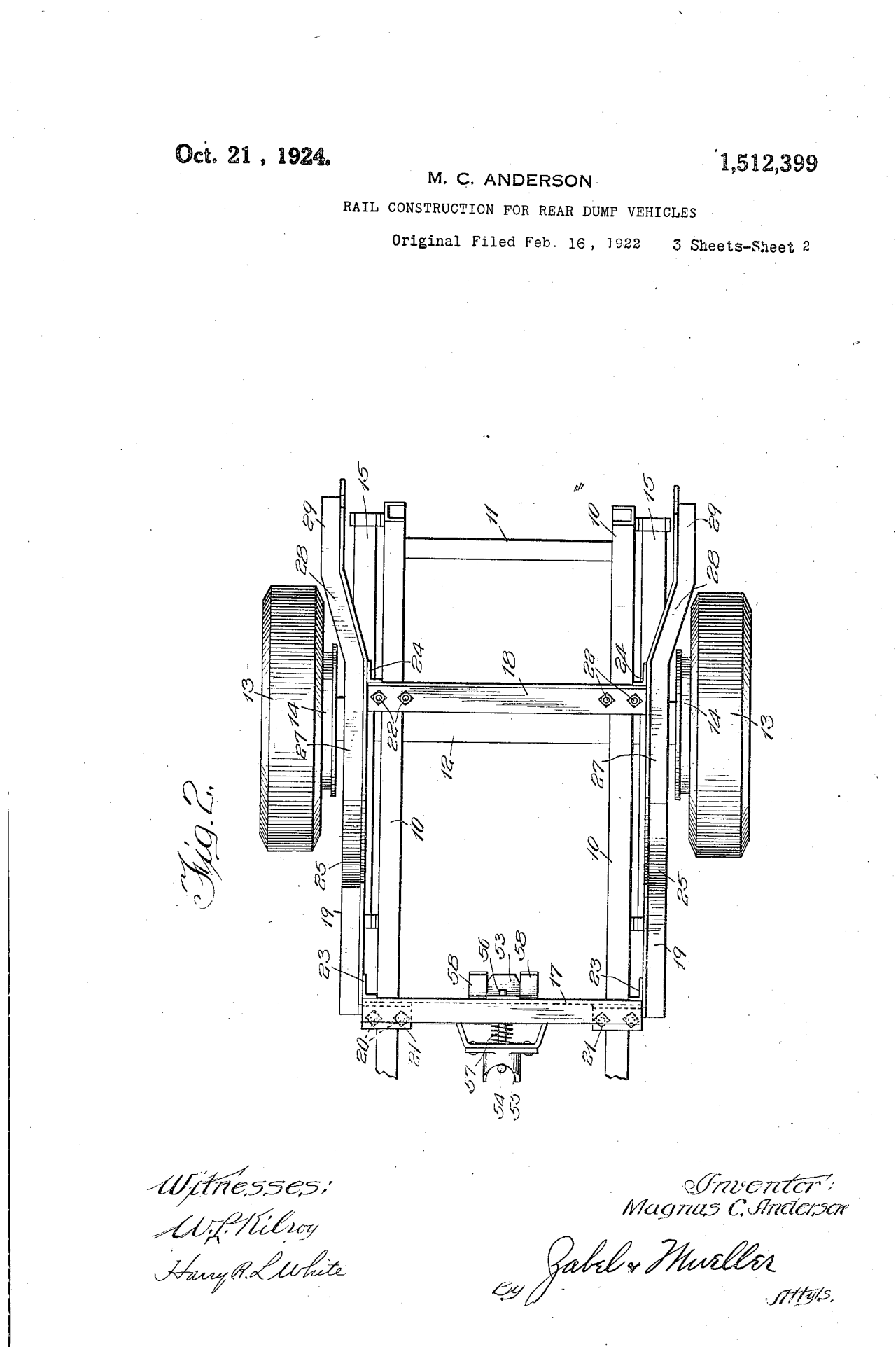

Oct. 21, 1924.
1,512,399
M. C. ANDERSON
RAIL CONSTRUCTION FOR REAR DUMP VEHICLES
Original Filed Feb. 16, 1922  3 Sheets-Sheet 2

Fig. 2.

Witnesses:
W. F. Kilroy
Harry R. L. White

Inventor:
Magnus C. Anderson
By Zabel & Mueller
Attys.

Oct. 21, 1924.
M. C. ANDERSON
1,512,399
RAIL CONSTRUCTION FOR REAR DUMP VEHICLES
Original Filed Feb. 16, 1922  3 Sheets-Sheet 3
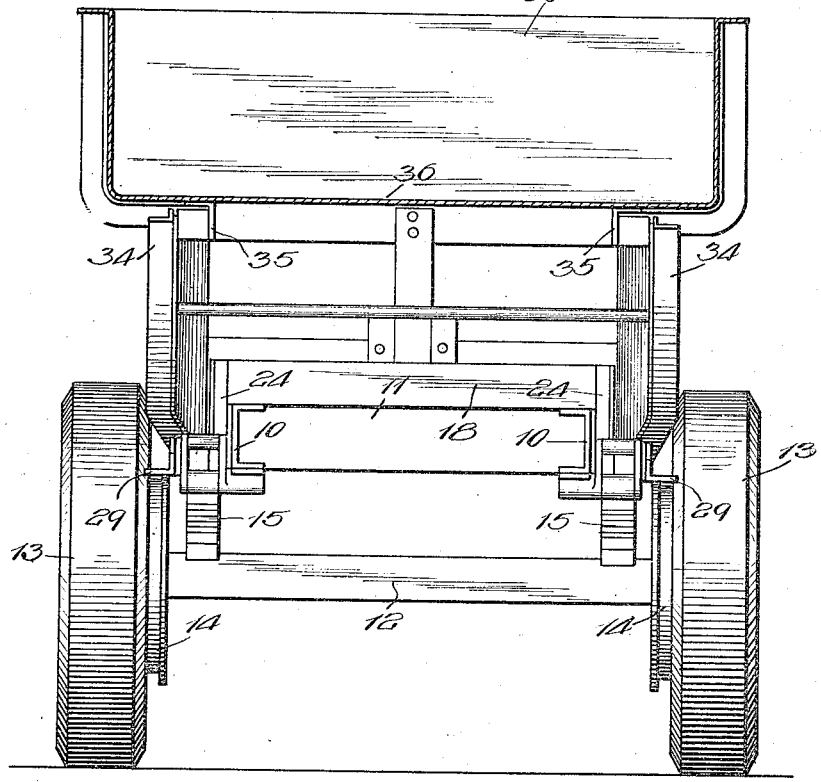
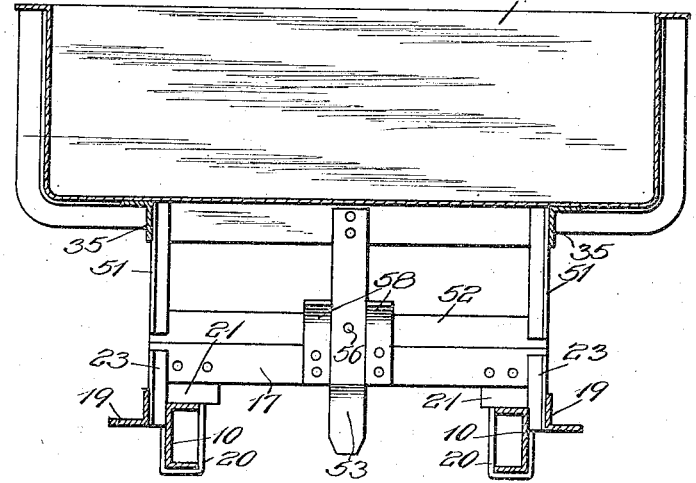
Inventor:
Magnus C. Anderson Patented Oct. 21, 1924.

1,512,399

UNITED STATES PATENT OFFICE.

MAGNUS C. ANDERSON, OF CHICAGO, ILLINOIS, ASSIGNOR, BY MESNE ASSIGNMENTS, TO LEE TRAILER & BODY COMPANY, OF CHICAGO, ILLINOIS, A CORPORATION OF ILLINOIS.

RAIL CONSTRUCTION FOR REAR-DUMP VEHICLES.

Application filed February 16, 1922, Serial No. 536,975. Renewed September 5, 1924.

*To all whom it may concern:*

Be it known that I, MAGNUS C. ANDERSON, a citizen of the United States, residing at Chicago, in the county of Cook and State of Illinois, have invented a certain new and useful Improvement in Rail Construction for Rear-Dump Vehicles, of which the following is a full, clear, concise, and exact description, reference being had to the accompanying drawings, forming a part of this specification.

My invention relates to rail construction for rear dump vehicles, and more particularly to a rail construction whereby a low center of gravity can be obtained for the vehicle body and load.

It is a purpose of the invention to provide a rear dump vehicle having a body thereon which is adapted to roll substantially automatically from load carrying to dumping position with rails or rockers which are adapted to cooperate with suitable rails or rockers secured to the vehicle framework, so that a low center of gravity can be obtained for the body and for the load carried thereby when in load carrying position, and whereby a maximum length of roll can be obtained for the body.

In certain types of self-propelled vehicles the springs and the brake drums at the rear wheels are placed in such a position that the runways or rails upon which the rockers secured to the body are adapted to roll, would interfere with said brake drums and springs if the runways were placed at the lowest possible position. In the present invention means is provided for obtaining the lowest possible location for the runway without interfering with the springs and brake drums.

It is a purpose of the invention to provide a runway that is located below the top surface of the framework, and in order to depress the same a maximum distance below the top surface of the vehicle framework, the runway is preferably offset laterally so as to avoid the springs and brake drums, or any other parts, that would interfere with the location of the runway at the lowest possible position.

It is a further purpose of the invention to provide a rocker with an offset portion conforming to the offset in the cooperating runway and to provide a rocker with pivot means that is adapted to cooperate with a socket member on the rail member of the runway to permit the body to discharge its contents with a final pivotal movement, if this is desired.

It is another purpose of the invention to provide a supplemental framework that may be mounted on a vehicle framework having transverse members positioned on the vehicle framework and having longitudinally extending members, portions of which serve as runways, upon which the rockers are adapted to roll, said longitudinally extending members being offset vertically to avoid one of the ends of each of the springs, and being laterally offset to avoid the brake drum and the other end of the springs, said longitudinally extending members depending from the transverse members.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 2 is a plan view of the rear end portion of the vehicle showing the supplemental framework mounted thereon;

Fig. 3 is a section taken on the line 3—3 of Fig. 1; and

Fig. 4 is a section taken on the line 4—4 of Fig. 1.

Figure 1:
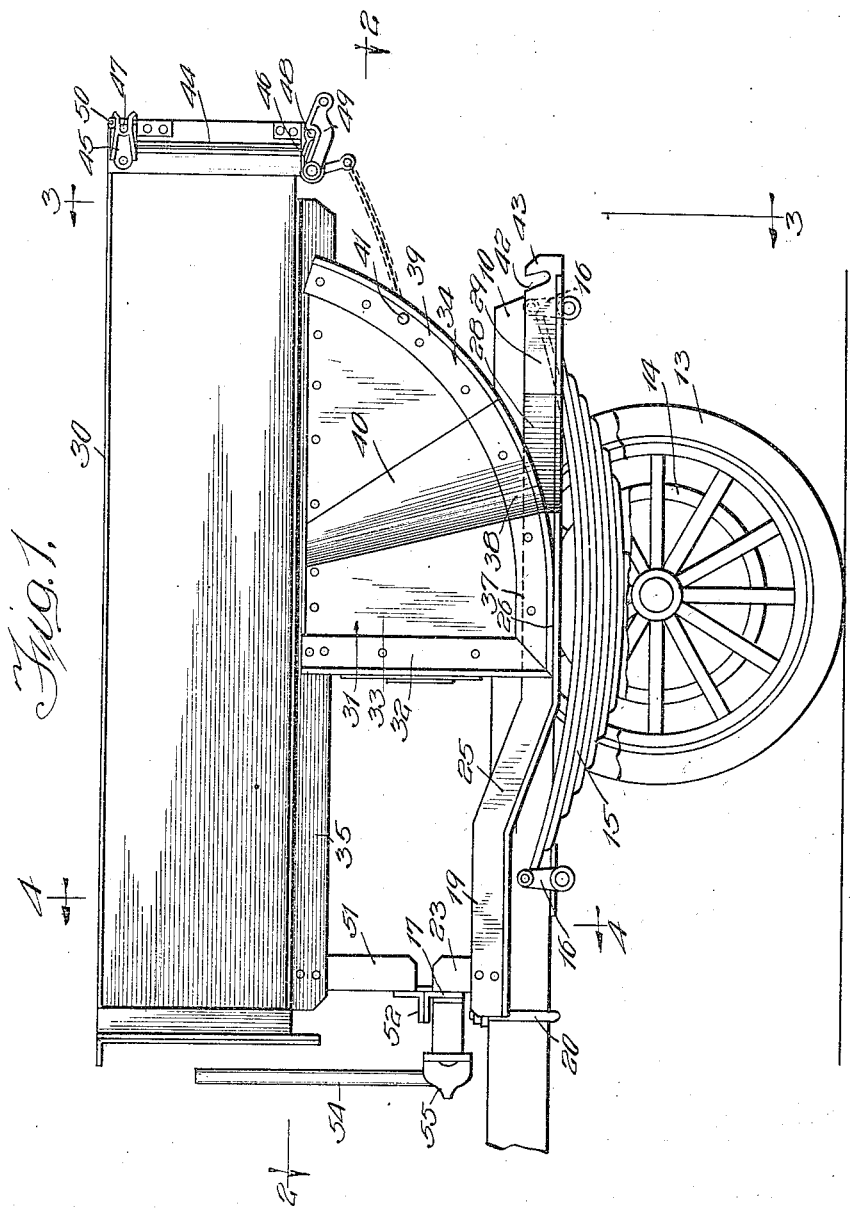
Fig. 1 is a fragmentary side elevational view of the rear end portion of a vehicle showing my improved rail construction applied to the framework and to a body or hopper that is adapted to roll substantially automatically to dumping position from load carrying position.

Referring in detail to the drawings, the vehicle framework comprises the longitudinally extending members 10 and the rear transverse member 11 is shown. The vehicle having said framework is provided with a rear axle 12, rear wheels 13 having brake drums 14, and is provided with springs 15 mounted between said axles and the framework. The springs are secured to the longitudinally extending members of the framework by means of the customary links 16 which are pivoted to the framework in any desired manner. Mounted on the vehicle framework and secured to the longitudinally extending members 17 and 18 is a supplemental framework comprising the longitudinally extending members 19. The forward transverse members 17 is secured to the longitudinally extending members 10 by means of U-bolts 20 and angle plates 21 riveted to the member 17, while the rear transverse member 18 is secured to the longitudinally extending members 10 by means of the bolts 22. The members 19 are secured to the transverse member 17 by means of the brackets 23 and to the rear transverse member 18 by means of the brackets 24. The forward end portions of the rails 19, as will be clear from Fig. 1, are raised so as to avoid the forward end portion of the spring 15 and any other parts that would be interfered with by said member. A downwardly inclined portion 25 of each of the members 19 connects the forward end portion thereof with the depressed portion 26 of each of said members. The portion 26 of each of the rail members 19 is provided with a portion 27 which extends parallel to the length of the framework, and which is positioned inwardly of the brake drums 14 or between said brake drums and the vehicle framework, a diagonally extending portion 28 and an offset portion 29 extending parallel to the portion 27 which extends outwardly laterally beyond the springs 15.

It will thus be seen that by providing the downwardly deflected portion in the longitudinally extending members of the supplemental framework, it is possible to depress the runway considerably below the top surface of the vehicle framework without interfering with the forward ends of the springs, and by providing the laterally offset portions for the rails, whereby one portion of each rail is positioned between the brake drum and the vehicle framework and the other portion thereof is positioned outwardly of the rear end portion of the spring, the brake drum and the rear end portion of the spring is avoided, although the runway is depressed below the top surface of the vehicle framework. The body 30 is adapted to roll on the runway, referred to above, substantially automatically from load carrying to discharge position and to return to load carrying position. The rockers 31 are provided on the body to cooperate with the rail members so as to provide for the rolling of the body to dumping position and the return thereof to load carrying position. The rockers 31 comprise the vertically extending members 32, the plates 33 and the curved rail members 34. The angle 32, the curved rail member 34 and the plate 33 of each rocker are secured to the longitudinally extending angle members 35 which are secured to the bottom 36 of the hopper or body 30. The curved portions 34 of the rockers are provided with inner portions 37 diagonally extending portions 38 and outer portions 39, thus providing rockers having offsets therein corresponding to the offsets in the depressed portions of the rails 26. The plate 33 is provided with an offset 40 corresponding to the offset 38 in the angle 34. Extending between the rockers 31 is the transverse rod 41 which is adapted to enter the sockets in each of the rail portions 29 to pivot thereabout so as to provide for a final pivotal dumping movement for the body when this is desired. Hooks 43 are formed on the ends of the rails due to the diagonally extending slots forming the sockets 42. The body 30 is provided with an end gate 44 which is provided with brackets 45 and 46 having sockets for receiving the pivot members 47 and 48 and being provided with a latch 49, said end gate being double acting as the same may pivot about the upper pivot member 47 when the latch 49 is disengaged from the pin 48 and about the pin 48 when the cotter pin 50 is removed from the brackets 45. The forward end portion of the body 30 is provided with depending bracket members 51 to which the angle 52 is secured, which is adapted to seat on the angle 17. Said forward end portion of the hopper is provided with suitable means for locking the same in load carrying position comprising the depending member 53 adapted to receive a locking member actuated by the handle 54 which cooperates with the cam member 55 for moving the locking member into and out of locking position. The locking member preferably comprises a bolt 56 which is projected into locking position by means of the spring 57, and suitable guide members 58 are preferably provided on opposite sides of the middle of the member 17 so as to guide the member 53 into lock engaging position.

Having thus described my invention, what I desire to claim and secure by U. S. Letters Patent is:

1. In a device of the character described, a vehicle framework, and a runway on said framework depressed below the top surface of said framework and having a lateral offset therein.

2. In a device of the character described, a vehicle framework, and a supplemental framework mounted on said vehicle framework comprising transversely extending members resting on said vehicle framework and longitudinally extending members depending from said transversely extending members, said members being laterally offset.

3. In a device of the character described, a vehicle framework, a runway thereon having an offset therein, a dumping body adapted to roll to dumping position on said runway, and a rail on said body having an offset therein corresponding to the offset in said runway.

4. In a device of the character described, a vehicle framework, a dumping body, and a runway on which said body is adapted to roll to dumping position, said runway being depressed below the top surface of said framework, and having a lateral offset therein.

5. The combination with a vehicle framework having wheels thereon of a pair of longitudinally extending offset rail members, means for securing said rail members to said framework with the bearing surfaces thereof depressed below the top surface of said framework and extending between said wheels and framework and a dumping body having means engaging with said rails and adapted to roll thereon to move said body to dumping position.

6. A device of the character described comprising a vehicle framework, wheels carrying said framework and a runway mounted on said framework and depressed below the top surface of said framework, said runway having a portion extending between said wheels and said framework, and a portion laterally offset rearwardly of said wheels.

7. A device of the character described having a framework comprising longitudinally extending members provided with raised and depressed portions, said depressed portions having lateral offsets therein.

8. In a device of the character described, a vehicle framework, a runway thereon having a lateral offset therein, a dumping body adapted to roll to dumping position on said runway, and a rail on said body having a lateral offset therein corresponding to the lateral offset in said runway.

In witness whereof, I hereunto subscribe my name this 7th day of February, A. D. 1922.

MAGNUS C. ANDERSON.